(12) United States Patent
Levine

(10) Patent No.: US 7,842,228 B1
(45) Date of Patent: Nov. 30, 2010

(54) CONTINUOUS REFRACTORY ORE BIOPROCESSING APPARATUS

(75) Inventor: Bart Levine, Mountain Lakes, NJ (US)

(73) Assignee: Western American Mining Company, Austin, TX (US)

( * ) Notice: Subject to any disclaimer, the term of this patent is extended or adjusted under 35 U.S.C. 154(b) by 411 days.

(21) Appl. No.: 12/101,968

(22) Filed: Apr. 12, 2008

(51) Int. Cl.
*C22B 3/18* (2006.01)
*B65B 33/14* (2006.01)
*C22B 3/02* (2006.01)

(52) U.S. Cl. ................... 266/168; 266/176; 266/183; 266/196; 198/459.3; 198/657; 198/860.1

(58) Field of Classification Search ............ 266/168, 266/176, 183, 196; 198/459.3, 657, 860.1
See application file for complete search history.

(56) References Cited

PUBLICATIONS

Fernano Acevedo, The use of reactors in biomining processes, EJB Electronic Journal of Biotechnology, Dec. 15, 2000, 1-11, vol. 3 No. 3, Universidad Católica de Valparaíso, Chile.

*Primary Examiner*—George Wyszomierski
*Assistant Examiner*—Lois Zheng
(74) *Attorney, Agent, or Firm*—Dykas & Shaver, LLP; Elizabeth Herbst Schierman

(57) ABSTRACT

Disclosed is a continuous refractory ore bioprocessing apparatus for the digestion of metal ore with bacteria. It includes a long trough tank fitted with a screw conveyer that extends along the length of the tank. A shell, having a number of feed ports, covers the screw conveyer. Granules of ore to be bioprocessed pass through the feed ports toward the screw conveyer portion of the reactor wherein the ore is ground by the screw conveyer and is bioprocessed as the screw conveyer rotates to push the ore along the reactor. Gas distribution manifolds are attached to the tank and are configured so that gas may be injected into the tank and onto the surface of the shell so as to encourage agitation of the materials in the tank and in the screw conveyer portion of the bioreactor while discouraging fouling of the shell and clogging of the feed ports.

9 Claims, 2 Drawing Sheets

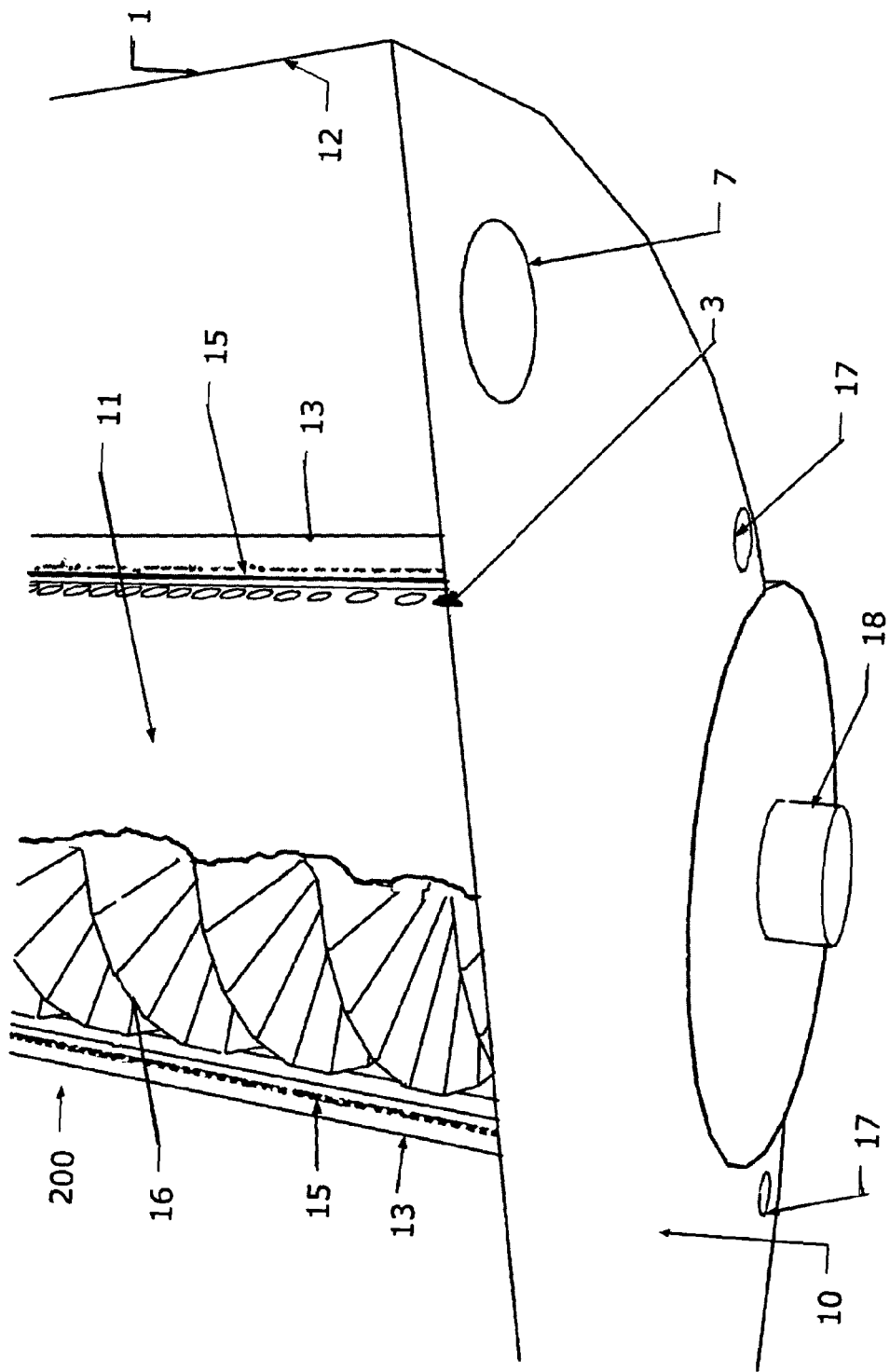

CONTINUOUS REFRACTORY ORE BIOPROCESSING APPARATUS

FIELD OF THE INVENTION

The invention relates generally to apparatus for implementing biological methods applied to the mining industry and more particularly to apparatus for continuous-feed bioreactors used for mineral oxidation.

BACKGROUND OF THE INVENTION

Biomining makes use of microorganisms in processes aimed at extracting metals from sulfide- and/or iron-containing ores and other mineral concentrates. For example, biomining can be used to recover gold from certain ores. That is, although gold is inert to microbial action, microbes can be used in processes to recover gold from certain ores because the microbes oxidize the ore thereby opening the structure of the ore, which allows gold-solubizing chemicals, such as cyanide, to penetrate the ore.

Biomining is particularly helpful when attempting to retrieve minerals like gold from "refractory" ores. With such refractory ores, conventional fine grinding and cyanidation are not as efficient at retrieving the desired minerals from the ore as biomining. Further, biomining with biooxidation, compared to other oxidation mining techniques, such as roasting and pressure oxidation, is relatively simplistic, requires only mild operating conditions, has low capital costs, requires relatively low amounts of energy, and is friendly toward the environment.

As discussed in Fernando Acevedo's article on "The use of reactors in biomining processes," EJB ELECTRONIC JOURNAL OF BIOTECHNOLOGY, Vol. 3, No. 3, Dec. 15, 2000, available at http://www.ejb.org/content/vol3/issue3/full/4, biooxidation of refractory gold ores with the use of heap operations or tank reactors is well known in the field of biomining. However, each method of biomining has its negatives. For example, though heap operation is simple and adequate to handle large volumes of ores, the productivity and mineral yields are limited because of the inherent difficulty of adequately controlling the process conditions of the heaps. Tank reactors, on the other hand, can handle moderate volumes of ore to be processed, allow for close monitoring and control of process conditions, and render significantly better performance yields than the heap operations. However, the costs for biomining with tank reactors are significantly higher than the costs for biomining with heap operations. The additional cost of the tank reactor methods may be justified only when the ore input to the reactors have a high value of mineral concentrate.

Two common tank reactors are batch reactors and continuous flow reactors. With batch reactors, generally, all of the inputs to the system are included in one container and allowed to react therein to form a final product, which is removed after the reaction is complete. With continuous flow reactors, however, the inputs to the system are included as the reaction is undergoing and as final product is removed from the reactor. Continuous flow reactors are generally more costly to operate. Regardless, their use may be preferred to batch reactors in many cases. The additional operation costs associated with continuous flow reactors, compared to batch reactors, are worthwhile when continuous flow reactors can handle higher volumes of product and therefor allow for increased throughput of a sufficient scale so as to improve project economics overall.

In any regard, during the biooxidation process of gold-containing ore, bacteria, such as those belonging to the *Thiobacillus* or *Leptospirillum* genera, partially oxidize sulfide coatings covering the gold micro particles contained within the ores. These microorganisms are capable of dissolving sulphides, such as pyrite and arsenopyrite, so as to liberate the otherwise-encapsulated gold particles within the ore. Following subsequent processing, such as through cyanidation, gold yields from the ore have been known to reach levels of approximately 85-95%, as opposed to yields of 15-30% when biooxidation is not utilized.

As Fernando Acevedo explains in his article,

> [s]everal mass transfer operations occur in a biomining operation. Nutrients have to reach the attached and suspended cells, metabolic products have to migrate from the cells to the liquid and solubilized species must be transported from the surface of the mineral particles to the liquid. In addition, two other important transport processes are to be considered: the supply of oxygen and carbon dioxide from the air to the cells. Carbon dioxide is demanded by the cell population as carbon source, while oxygen is needed as the final electron acceptor of the overall oxidation process. In reactors these gases are usually supplied by bubbling air into the liquid. In order to be used by the cells, oxygen and carbon dioxide must dissolve in the liquid, a mass transfer operation that presents a high resistance and can become limiting for the overall process rate.

Fernando Acevedo, *The Use of Reactors in Biomining Processes*, Vol. 3, No. 3., EJB ELECTRONIC JOURNAL OF BIOTECHNOLOGY, Dec. 15, 2000, available at http://www.ejb.org/content/vol3/issue3/full/4. Accordingly, agitation of the ore to be bio-mined via a bacteria-containing slurry is beneficial to increase transfer rates, including the rates of transfer of oxygen and carbon dioxide as well as heat transfer. Agitation also discourages stagnation of the materials in the bio-reactors and reduces occurrences of unwanted zones of reactor contents with insufficient nutrients, inadequate temperatures, or inadequate pH levels. Ideal bio-reactors allow for optimal agitation and are devoid of stagnant zones within the reactor.

Because batch reactors require stopping of material transfers to change batches and have poor restart kinetics once a new batch is added to the reactor, batch reactors offer limited opportunities to allow for agitation and to prevent stagnate zones within the reactor. On the other hand, continuous flow reactors, by virtue of their continuous processing and movement of product into and out of the reactor, present more opportunities for agitation and for discouraging stagnation. Thus, continuous flow reactors are better suited for optimizing reaction conditions.

Accordingly, what is needed is a bioreactor having agitation and productivity features that can economically accommodate biooxidation of significant volumes of mineral-containing ore while producing high yield levels of the desired mineral.

SUMMARY OF THE INVENTION

Embodiments of the present continuous refractory ore bioprocessing apparatus provide for accelerated and more complete reaction of biomining reactor contents with reduced capital investments.

The continuous refractory ore bioprocessing apparatus combines the milling of granular ore, the mixing with bioreactor liquid contents, and the transportation of solids along a reactor through the use of an Archimedean screw conveyer. A gas diffuser is employed so as to encourage agitation of the contents of the bioreactor while providing sufficient gas diffusion therethrough to discourage fouling of ports between the screw conveyor's shell and the interior of the bioreactor.

More specifically, the continuous refractory ore bioprocessing apparatus includes a horizontal bioreactor tank or trough that is generally long and slender with a covered screw conveyer subassembly lying along the middle of the bottom of the tank such that a portion of the outer surface of the tubular shell cover to the screw conveyer essentially forms the bottom of the tank. The side walls of the bioreactor tank have shapes configured to encourage solid ore granules deposited within the tank to gather, under the force of gravity, at the bottom of the tank where they come into contact with a portion of the outer surface of the shell of the screw conveyor subassembly. The shell of the screw conveyer subassembly defines a number of feed ports through which the granules of ore or other solid sediments within the tank may pass into the screw conveyer subassembly.

The tank reactor is of a size configured to provide a number of days of residence time for the solids conveyed through the tank via the screw conveyer. The screw conveyer is constructed of a material with a strength sufficient to crush granular ore between the inner surface of the tubular shell and the radial circumferences of the rotating helix of the screw conveyer. Ideally, the screw conveyer will have a hardness less than that of the tubular shell so that the screw will erode before the tubular shell erodes. Accordingly, it is further ideal for the tank and screw conveyer subassemblies to be configured so as to allow for removal and replacement of the screw.

The size and number of the feed ports defined by the shell should be chosen based on the desired ore feed rate to the screw conveyer, the grain size of the ore that is added to the reactor, the clearance between the inner surface of the tubular shell and the radial circumference of the rotating helix of the screw conveyer, and the power available for rotating the screw.

The granules of ore fed to the tank are preferably distributed evenly along the length of the tank so that as the granules settle to the bottom of the tank and come into contact with the outer surface of the tubular shell, an even aging of the material will be achieved. In some embodiments, an additional conveyer subassembly may be added to encourage even distribution of the granules fed to the tank and to encourage even aging of the granules.

Fitted along portions of the outer surface of the shell where the shell connects with the long side walls of the tank is one of a pair of gas distribution manifolds. To each of the gas distribution manifolds is fed a supply of gas from outside of the tank via a gas feed port. Each gas distribution manifold defines a number of openings configured to allow passage of the gas from within the manifold into the tank. More specifically, the openings are directed so that gas will jet through the opening and onto the feed ports defined by the shell. In this way, the gas encourages transportation of the granules through the shell openings and discourages fouling along the outer surface of the shell. Blasting gas through the manifold openings may also be used to clear clogs in the feed ports.

Because gas will be forcibly directed onto the outer surface of the shell via the manifold openings, without venting, gas will inevitably travel through the feed ports (along with the granules of ore) and accumulate in the tubular screw conveyer subassembly. Accordingly, the shell also defines an array of vent holes along the highest portions of the shell so that gas may escape from the tubular shell therethrough. Further, the bubbling of the gas up through the contents of the screw conveyer subassembly creates a central upwelling of the material contained within the screw conveyor subassembly and induces a circulation along each side of the tank along its length. Thus, when air is the gas injected into the system via the manifold openings, agitation of the contents of the screw conveyer subassembly is encouraged and oxygen is provided.

The fluid levels in the tank are maintained by use of inlet and exit ports defined by the top portions of the tank walls. The concentrations and other characteristics of the reaction solutions within the tank may be monitored for chemistry and bioactivity and controlled with supplementation or exchange via these same inlet and exit ports. In some applications, replacement flows could run countercurrent to the flow direction of the processing ore granules.

Reacted solids exiting the reactor by the screw conveyer subassembly are moved out of the screw conveyer subassembly and into a downstream product hopper. Ideally, the hopper and the reactor have the same fluid level. The product solids deposited into the hopper may be removed via another screw conveyer system. Alternatively, the bottom of the hopper may be fitted with a tap configured to accommodate emptying the hopper periodically.

It is preferred that the feeder ports defined by the shell are arranged as a pair of linear array of ports, each located on opposite portions of the outer surface of the tubular shell, portions that are lowest in the height in the tank, i.e., at a portion of the outer surface of the shell where granules of ore will gather due to gravity.

The residence time of the reactor is largely determined by the length of the tank. Generally, for longer residence times, a longer tank may be used. Further, although the screw conveyer would ideally turn quite slowly, there are practical limits as to how long the screw may be. Thus, it is expected that the reactors will ideally involve cascaded series of tanks feeding solids and/or liquids.

The purpose of the foregoing summary is to enable the public, and especially the scientists, engineers, and practitioners in the art who are not familiar with patent or legal terms or phraseology to determine quickly from a cursory inspection the nature and essence of the technical disclosure of the application. The summary is neither intended to define the invention of the application, which is measured by the claims, nor is it intended to be limited as to the scope of the invention in any way.

Still other features and advantages of the present apparatus will become more readily apparent to those skilled in this art from the following detailed description describing preferred embodiments of the invention, simply by way of illustration of the best mode contemplated by carrying out this apparatus. As will be realized, the apparatus is capable of modifications in various obvious respects all without departing from the invention. Accordingly, the drawings and description of the preferred embodiments are to be regarded as illustrative, and not as restrictive.

BRIEF DESCRIPTION OF THE DRAWINGS

FIG. 2 is a closer isometric, perspective view of the continuous refractory ore bioprocessing apparatus according to the first embodiment with part of the shell of the screw conveyer subassembly removed so as to be able to see the interior of the screw conveyer subassembly.

DESCRIPTION OF THE PREFERRED EMBODIMENTS

Figure 1:
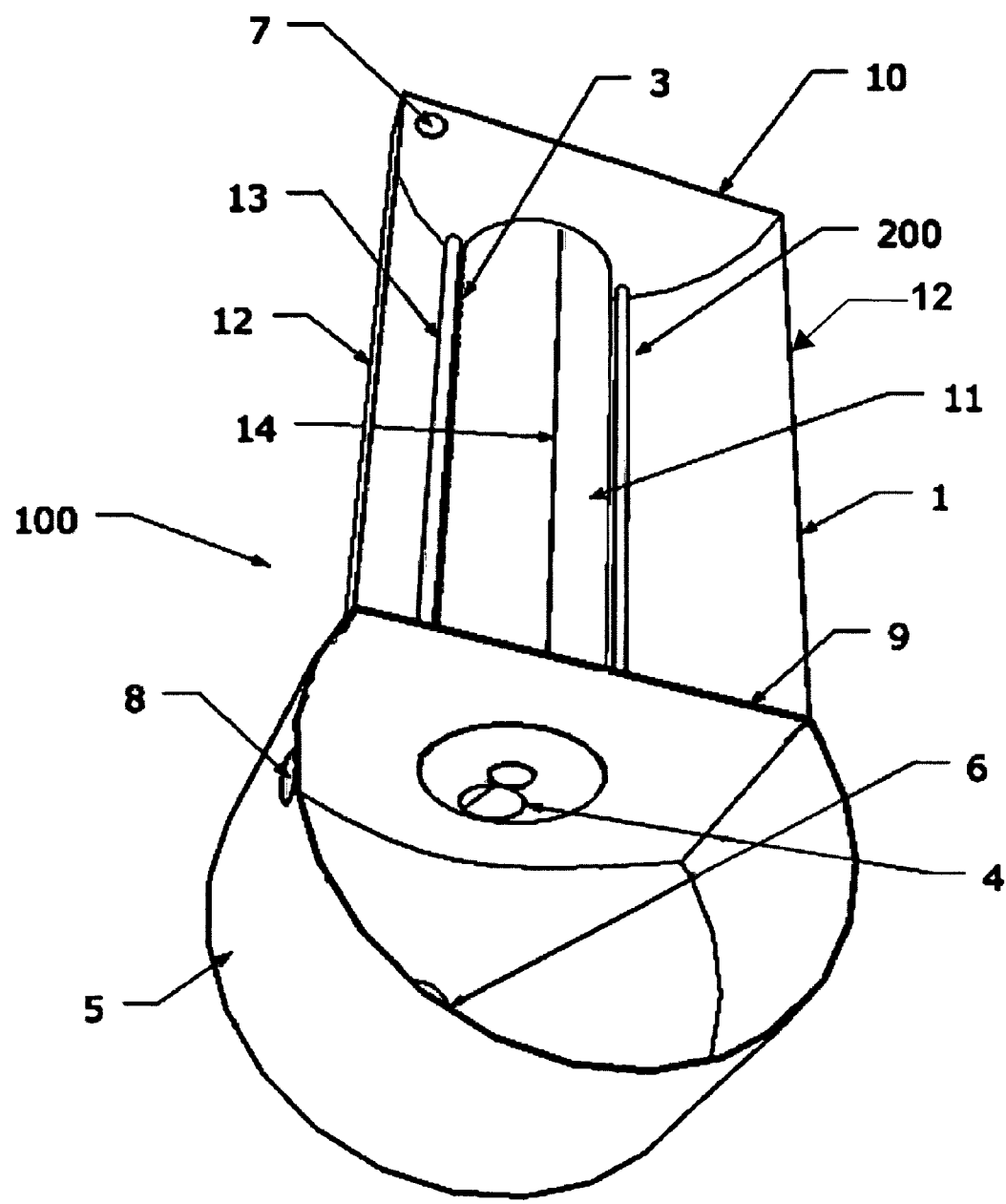
FIG. 1 is an isometric, perspective view of a first embodiment of the continuous refractory ore bioprocessing apparatus.

While the apparatus is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in the figures for purpose of illustration, the continuous refractory ore bioprocessing apparatus is embodied in a biooxidation reactor containing a conveyer contained within a shell that is attached to a tank. The conveyer is driven by a driver so as to move solids along the length of the reactor as the bioreaction occurs. When in use, this continuous flow bioreactor encourages agitation of the bioreactor's contents while discouraging fouling by solids in the tank.

In the following description and in the figures, like elements are identified with like reference numerals. The use of "or" indicates a non-exclusive alternative without limitation unless otherwise noted. The use of "including" means "including, but not limited to," unless otherwise noted.

The preferred embodiment of the continuous refractory ore bioprocessing apparatus is shown in FIGS. 1 and 2. In particular, the apparatus is a continuous flow bioreactor 100 that includes a tank 1 to which is attached a screw conveyer subassembly 200 in which a screw conveyer 16 is contained within a shell 11. More particularly, the tank 1 includes side walls 12 and end walls 9, 10, that are configured to encourage solids to gather at a lower portion of the tank 1 so as to come into contact with the outer surface of the shell 11.

The shell 11 defines a number of feed ports 3 that are configured to allow passage of solids from the tank 1 into the screw conveyer subassembly 200. Thus, when solids are fed into the tank 1, they may, under the force of gravity, settle toward the bottom of the tank 1, gathering at the lower portion of the tank 1 where the side walls 12 join with the shell 11 of the screw conveyer subassembly 200 and there have access to the feed ports 3.

The screw conveyer 16 is configured to encourage transportation of the solids, once they have entered the screw conveyer subassembly 200, along the length of the tank 1. More specifically, the screw conveyer 16 is driven by a driver that rotates the screw conveyer 16 so as to push the solids along the length of the tank 1. Preferably, the driver includes an axial shaft 18 that is operatively connected to the screw conveyer 16. As the solids are pushed along the tank 1 through the screw conveyer subassembly 200, solids that come into contact with both the radial circumference of the screw conveyer 16 and the interior surface of the shell 11 will be crushed or ground down by the forced exerted on the solids by the interaction.

The bioreactor 100 is further fitted with a number of gas distribution manifolds 13 that are attached to the tank 1 or to the shell 11 at a lower portion of the tank 1, such as where the tank side walls 12 connect with the shell 11. The gas distribution manifolds 13 define a number of openings 15. Together, the gas distribution manifolds 13 are configured to receive gas from outside of the bioreactor 100 via gas supply ports 17 in the bioreactor 100 and to transport that gas through the openings 15 and into the tank 1. Further, the gas distribution manifolds 13 and openings 15 are configured so that when gas is injected into the tank 1, the gas comes into contact with at least a portion of the outer surface of the shell 11 so as to discourage accumulation of solid deposits thereon and to discourage clogging of the openings 15. Further, it is preferred that the gas distribution manifolds 13 and openings 15 be further configured to encourage material that has accumulated on the outer surface of the shell 11 to pass through the feed ports 3 and into the screw conveyer subassembly 200.

Further, it is expected that the gas injected into the tank 1 via the gas distribution manifolds 13 will find its way into the screw conveyer subassembly 200. As it does so, the gas will encourage mixing and agitation of the contents of the screw conveyer subassembly 200 and, assuming air is the gas supplied through the gas distribution manifolds 13, oxygen will be provided to the microorganisms involved in the bioreaction within the screw conveyer subassembly 200.

In light of the supply of gas into the screw conveyer subassembly 200, the shell 11 further defines at least one gas vent port 14 configured to allow venting of the gas that would otherwise accumulate within the screw conveyer subassembly 200.

Accordingly, during the bioprocessing, refractory ore solids are supplied to the tank 1 and travel through the feed ports 3, preferably with encouragement from gas being injected into the tank 1 from the gas distribution manifolds 13. The ore solids, once in the screw conveyer subassembly 200, are acted upon by microorganisms in the biooxidation processes and are further ground down in size by the crushing power of the screw conveyer 16 as the solids come into contact with both the outside edge of the screw conveyer 16 and the inner surface of the shell 11. Further, agitation of the materials within the screw conveyer subassembly 200 are encouraged by the gas injected into the screw conveyer subassembly 200 via the feed ports 3 courtesy of the openings 15 in the gas distributor manifolds 13. The bioprocessing occurs as the materials are encouraged to travel the length of the tank 1 via the driving force of the screw conveyer 16, which is rotated via the axial shaft 18 by a driver. The rotation of the screw conveyer 16 pushes the materials along, eventually causing the processed materials to exit the screw conveyer subassembly 200 via an exit port 4. Preferably, the processed materials are deposited into a hopper 5 that is attached to or is next to the tank 1. In the hopper 5, the process solids may be removed via a drain port 6 defined by the bottom of the hopper 5.

Within the tank 1, itself, solids and/or liquid reactants are supplied by insertion of the same into the tank 1 via a fill port 7 defined by a tank end wall 10. The level of the material within the tank 1 and, preferably, within the hopper 5 as well, are controlled by the inclusion of an overflow port 8. As shown in FIG. 1, the overflow port 8 may be defined by the wall of the hopper 5.

The material chosen to construct the continuous refractory ore bioprocessing apparatus should be a material that will not be corroded by the reactants added to the bioreactor 100. Notably, some bacteria commonly utilized in biomining reactions thrive at acidic pH levels. Such levels would be incompatible with apparatus comprised of carbon steel, for instance. Accordingly, stainless steel or a similar protective coating is preferred. In cases in which surfaces stronger than stainless steel are needed, super alloys or exotic ceramic coatings may be utilized.

To put the foregoing in a clearer context, in a gold biomining operation, the inputs to the continuous refractory ore bioprocessing apparatus would be amounts of refractory gold ore and process water. These would be together to yield a slurry of approximately 10-15% solid density. Further, the slurry would be fed to the tank 1 at acidic pH levels. Additionally, the processed biomined residue would be ultimately collected from the hopper 5, lime treated, and cyanided.

The speed of the rotation of the screw conveyer 16 should be one that allows ore granules inserted within the screw conveyer subassembly 200 to remain in the screw conveyer subassembly 200 for a period of time necessary to achieve a desired reaction progress. However, the speed should be fast enough so as to encourage sufficient milling of the ore granules when they come into contact with the radial circumferences of the screw conveyer 16 and the inner wall of the shell 11.

The exemplary embodiments shown in the figures and described above illustrate, but do not limit, the invention. It should be understood that there is no intention to limit the invention to the specific form disclosed. Rather, the intention is to cover all modifications, alternative constructions, and equivalents falling within the spirit and scope of the invention as defined in the claims. For example, while the exemplary embodiments illustrate the use of a hemi-cylindrical metal tank, a lined ditch could be made to function similarly as the tank. Further, while it is preferred that a rigid screw conveyer subassembly 200 be utilized so as to allow for milling and grinding of solids that come into contact with it and the inner surface of the shell 11, in other embodiments a flexible screw conveyer may be utilized that does not allow for the milling and grinding but may be configured so as to avoid the need for a hopper 5 or other product extraction conveyer. Still further, the gas distribution manifolds 13 may be variously located. While shown in the figures to be attached to the side walls 12 of the tank 1, the gas distribution manifolds 13 may be otherwise attached to the bottom of the tank 1, to the outer surface of the shell 11, or to the inner surface of the shell 11.

Further, while the apparatus is not limited to use with gold ore, it is expected that various embodiments of the apparatus will be particularly useful in other mixing activities. Hence, the foregoing description should not be construed to limit the scope of the invention, which is defined in the following claims. Accordingly, while there is shown and described the present preferred embodiment of the apparatus, it is to be distinctly understood that this apparatus is not limited thereto but may be variously embodied to practice within the scope of the following claims. From the foregoing description, it will be apparent that various changes may be made without departing from the spirit and scope of the apparatus as defined by the following claims.

What is claimed is:

1. A continuous refractory ore bioprocessing apparatus comprising:
    a tank having a length, end walls, side walls, and a bottom;
    a conveyer subassembly fixedly positioned along said bottom of said tank and extending lengthwise along said bottom of said tank, said conveyer subassembly comprising
        a conveyer configured to encourage transportation of solids along said length of said tank;
        a driver operationally connected to said conveyer and configured to drive said conveyer to transport said solids along said length of said tank; and
        a shell having an outer shell surface and an inner shell surface, said shell containing said conveyer, said shell connected to low portions of said end walls and said side walls, said shell defining a plurality of feed ports, said feed ports configured to allow passage of said solids from said tank into said conveyer subassembly, said shell defining at least one gas vent port, each of said gas vent ports configured to accommodate venting of gas from within said conveyer subassembly to said tank; and
    a plurality of gas distribution manifolds, connected to said tank and extending along said length of said tank, each of said gas distribution manifolds defining a plurality of openings, said gas distribution manifolds configured to receive gas from a gas source and each of said openings configured to accommodate passage of gas from said gas distribution manifold through said opening and into said tank and into contact with at least a portion of said outer shell surface so as to discourage fouling of said outer shell surface;
    whereby said solids and process liquid are fed to said tank and said solids are allowed to sink to a low portion of said tank so as to move through said feed ports in said shell into said conveyer subassembly in which said solids will be processed as said solids are moved along said length of said tank via said conveyer before being deposited in a product hopper and while gas is injected into said tank via said gas distribution manifolds so as to encourage agitation of said solids and process liquids contained within.

2. The continuous refractory ore bioprocessing apparatus of claim 1, wherein each of said gas distribution manifolds is fixedly attached to said outer shell surface.

3. The continuous refractory ore bioprocessing apparatus of claim 1, wherein each of said gas distribution manifolds is fixedly attached to said inner shell surface.

4. The continuous refractory ore bioprocessing apparatus of claim 1, wherein each of said gas distribution manifolds is fixedly attached to said bottom of said tank.

5. The continuous refractory ore bioprocessing apparatus of claim 1, wherein each of said gas distribution manifolds is fixedly attached to one of said side walls of said tank.

6. The continuous refractory ore bioprocessing apparatus of claim 1, wherein each of said openings in said gas distribution manifolds is further configured to encourage material that has accumulated around said outer shell surface to pass through said feed ports into said conveyer subassembly, whereby fouling of said feed ports will be discouraged.

7. A continuous refractory ore bioprocessing apparatus comprising:
    a tank having a length, end walls, side walls, and a bottom;
    a screw conveyer subassembly fixedly positioned along said bottom of said tank and extending lengthwise along said bottom of said tank, said screw conveyer subassembly comprising
        a screw conveyer configured to encourage transportation of solids along said length of said tank;
        a driver shaft operationally connected to said screw conveyer and configured to drive said screw conveyer to transport said solids along said length of said tank; and
        a shell having an outer shell surface and an inner shell surface, said shell containing said screw conveyer, said shell connected to low portions of said end walls and said side walls, said shell defining a plurality of feed ports, said feed ports configured to allow passage of said solids from said tank into said screw conveyer subassembly, said shell defining at least one gas vent port, each of said gas vent ports configured to accommodate venting of gas from within said conveyer subassembly to said tank; and
    a plurality of gas distribution manifolds, connected to said tank and extending along said length of said tank, each of said gas distribution manifolds defining a plurality of openings, said gas distribution manifolds configured to receive gas from a gas source and each of said openings configured to accommodate passage of gas from said gas distribution manifold through said opening and into said tank and into contact with at least a portion of said outer shell surface so as to discourage fouling of said outer shell surface;

whereby said solids and process liquid are fed to said tank and said solids are allowed to sink to a low portion of said tank so as to move through said feed ports in said shell into said screw conveyer subassembly in which said solids will be processed as said solids are moved along said length of said tank via said screw conveyer before being deposited in a product hopper and while gas is injected into said tank via said gas distribution manifolds so as to encourage agitation of said solids and process liquids contained within.

8. The continuous refractory ore bioprocessing apparatus of claim 7, wherein said shell is a tubular shell.

9. The continuous refractory ore bioprocessing apparatus of claim 7, wherein said screw conveyer has a radial circumference and wherein said screw conveyer is further configured to crush said solids when said solids come between said radial circumference and said inner shell surface.

* * * * *